Feb. 19, 1963 T. B. FRAME ETAL 3,078,123
WHEEL COVER
Filed May 16, 1960

INVENTORS
*Thomas B. Frame*
*Arnold J. Maletzke &*
*Wayne A. Smith*
BY
*Herbert Furman*
ATTORNEY

3,078,123
WHEEL COVER
Thomas B. Frame, Syracuse, Arnold J. Maletzke, Fayetteville, and Wayne A. Smith, Manlius, N.Y., assignors to General Motors Corporation, Detroit, Mich., a corporation of Delaware
Filed May 16, 1960, Ser. No. 29,326
1 Claim. (Cl. 301—37)

This invention relates to wheel covers and more particularly to a wheel cover having new and improved self-retaining means adapted to grippingly engage a vehicle wheel in order to removably mount the wheel cover thereon.

One of the features of the wheel cover of this invention is that it can be easily and conveniently applied to the outer side of a vehicle wheel, with the self-retaining means of the cover grippingly engaging an axially extending wheel rim flange so as to mount the cover thereon. Another feature of this invention is that it provides a wheel cover having improved self-retaining means which include a plurality of flange segments independently yieldable with respect to each other in radial directions, with each flange segment merging on an arcuate juncture rib with a retaining flange having a plurality of radially and axially outwardly extending spaced fingers which are circumferentially arcuate with respect to the cover. A further feature of this invention is that it provides a wheel cover having self-retaining means which include a radially facing and axially extending retention flange structure having a plurality of spaced flange segments terminating in retaining finger structure, with the flange segments being spaced by intermediate arcuate cutouts, each such cutout being notched centrally thereof to allow the flange segments to flex independently of each other in radial directions with respect to the peripheral margin of the cover.

These and other features of this invention will be readily apparent from the following specification and drawings wherein:

FIGURE 1 is a sectional view of a wheel cover according to this invention;

FIGURE 2 is an enlarged view of a portion of FIGURE 1 taken generally along the plane indicated by line 2—2 thereof; and FIGURE 3 is a side elevational view of the cover shown in FIGURE 1.

Referring now to the drawings, a wheel cover 10 includes a central cone portion 12 which merges on an arcuate juncture rib into an axially facing radially extending annular cover flange or wall 14. Flange 14 merges on an arcuate juncture rib with an axially outwardly extending and radially inwardly facing annular cover flange 16 which forms the inner wall of an annular cover rib 18. The annular base wall or flange 20 of rib 18, which faces axially and extends radially, merges into the annular outer wall or flange 22 of the rib which faces radially outwardly and extends axially outwardly. Flange 22 merges on an arcuate juncture rib with a radially extending axially outwardly facing annular cover flange 24 which merges on an arcuate juncture rib with a radially outwardly extending and axially outwardly facing annular cover marginal flange 26. Flange 26 merges on an annular arcuate juncture rib 27 with a radially outwardly extending and axially outwardly facing marginal flange 28. Flange 28 merges on an arcuate peripheral juncture rib 30 with a continuous radially inwardly extending and axially inwardly facing annular cover marginal flange 32 which is adapted to bear against a radially outwardly extending and axially outwardly facing portion of a wheel rim terminal flange structure when the cover is mounted on a vehicle wheel to locate the cover axially of the wheel.

Flanges 28 and 32 and the juncture rib 30 define the terminal or peripheral marginal flange structure of the cover 10 and also provide an anchoring means for the retention flange structure which will now be described.

As best shown in FIGURES 2 and 3 of the drawings, the retention flange structure includes a plurality of circumferentially arcuate flange segments 36, four such segments being provided on the subject cover. Flange segments 36 are spaced apart by intermediate arcuate cutout portions 38, each of which is notched centrally thereof and axially of the cover at 40. The notches 40 extend axially outwardly to the annular tangent line between the flange segments 36 and the annular arcuate juncture rib 42 which joins the flange segments to the cover flange 32. Each of the flange segments 36 terminates in a radially and axially outwardly extending circumferentially arcuate retaining flange 44 which is joined to the flange segments by an arcuate juncture rib 46. Each flange 44 is provided with a plurality of spaced gripping teeth 48 which are coplanar with flange 44, with the flange 44 and the teeth lying in a cone of revolution having its apex at the axis of revolution and axially inwardly of cover 10, with the teeth being located generally at an angle of 45° to the cover axis. The teeth 48 have generally arcuate tapered sides 49 which merge on arcuate junctures with the cutouts 50 intermediate each of the teeth. The root of the teeth 48 is coincident with the annular line of contact between the cone of revolution of the teeth and the radius of each of the arcuate juncture ribs 46 between the flanges 44 and the flange segments 36. Further, the width of each tooth 48 is approximately one-half of the circumferential length of each of the cutouts 50.

When the cover 10 is mounted on a vehicle wheel, the flange 32 engages an axially facing and radially extending wheel rim portion, as previously described, while the teeth 48 grippingly engage a radially facing and generally axially outwardly extending wheel rim flange, such as an intermediate wheel rim flange, which is located adjacent to and axially inwardly of the axially facing and radially extending wheel rim portion. Since the flange segments 36 are not interconnected, except by the cover flange 32, each such segment is free to flex independently in radial directions whereby the cover is generally self-locating when mounted on the wheel. Further, it will be noted that the proximal portions of the flange segments, adjacent the juncture of the flange segments with the flange 32, are each defined by the notches 40 whereby these proximal portions have generally axially straight, side edge portions. By this arrangement, the proximal portions of each of the flange segments 36 are substantially stiffer than the distal portions which extend therefrom axially inwardly, and the side edges of which are generally of converging arcuate tapered shape. Thus, the proximal portions of each of the flange segments not only anchor the flange segments to the cover flange 32 and the peripheral marginal structure of the cover, but also back up the distal portions of the flange segments to thereby control the flexing of the flange segments in radial directions upon engagement of the fingers 48 with the wheel rim flange. Thus, each of the flange segments 32 is of a decreasing radial flexibility from the axially outer or proximal portion thereof to the axially inner or distal portion thereof to juncture of the flange segment with the retaining flange 44.

By spacing the fingers 48 apart a distance substantially twice the width of the cutouts 50 and by locating the root of each tooth coincident with the annular line of tangency between the cone of the teeth and the radius of the juncture ribs 46, we have found that the fingers are less likely to cause the cover to walk around the wheel rim flange in service and thereby cause relative rotation between the cover and the wheel. We have also found that an arrangement such as this eliminates all objectionable squeaking noise which is often caused by finger structures of other types wherein the retaining fingers, corresponding to the fingers 48, often rub or move relative to the wheel rim flange which they grip.

For a description of a suitable method by which the cover of this invention may be manufactured, reference may be had to the copending application of Thomas B. Frame et al., assigned to the assignee of this invention Serial No. 27,107 filed May 5, 1960. It will also be understood, of course, that although the subject cover has been described as having four flange segments, more such segments may be used, since the number of segments is directly related to the initial shape of the blank from which the wheel cover is made, as more fully set forth in the above mentioned copending application.

Thus, this invention provides a new and improved wheel cover having improved self-retaining means.

We claim:

A vehicle wheel cover comprising, a cover body including a peripheral turned marginal flange structure including a radially inwardly extending continuous flange having extending therefrom a generally radially facing and axially inwardly extending retention flange structure, said retention flange structure including a plurality of flange segments, each being independently yieldable in radial directions and merging on an arcuate juncture with a turned radially and axially outwardly extending circumferentially arcuate retaining flange adapted to grippingly engage a wheel to mount said cover thereon, each flange segment including a proximal portion adjacent juncture of the flange segment with said marginal flange structure defined by a pair of generally parallel axially extending side edge portions and being resistant to yielding in radial directions and a distal portion defined by a pair of converging arcuate side edge portions extending from said axially extending side edge portions to said retaining flange and being of gradually increasing radial flexibility from juncture thereof with a respective proximal portion, the adjacent side edge portions of each successive circumferential pair of flange segments defining a notch having the base edge portion thereof lying generally on the annular line of tangency between said continuous flange and said flange segments, each of said retaining flanges including a plurality of radially and axially outwardly extending circumferentially arcuate teeth spaced apart by intervening notches, each intervening notch being of a shallow radial depth and having a base edge of substantial circumferential arcuate length substantially equal to twice the tooth width, the root of said teeth and the base edges of said intervening notches being coincident with the annular line of contact between the cone of said teeth and the radius of each of said arcuate junctures.

References Cited in the file of this patent

UNITED STATES PATENTS

| | | |
|---|---|---|
| 1,817,194 | Hunt | Aug. 4, 1931 |
| 2,624,634 | Lyon | Jan. 6, 1953 |
| 2,772,924 | Landell | Dec. 4, 1956 |

FOREIGN PATENTS

| | | |
|---|---|---|
| 515,630 | Canada | Aug. 16, 1955 |
| 530,682 | Canada | Sept. 25, 1956 |